(12) United States Patent
Braunhardt

(10) Patent No.: US 6,902,477 B2
(45) Date of Patent: Jun. 7, 2005

(54) AXIAL SEPARATOR WITH GUIDE VANE

(75) Inventor: Klaus Braunhardt, Zweibrucken (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/417,005

(22) Filed: Apr. 16, 2003

(65) Prior Publication Data

US 2004/0009795 A1 Jan. 15, 2004

(30) Foreign Application Priority Data

Apr. 19, 2002 (DE) .......................... 102 17 466

(51) Int. Cl.⁷ .............................. A01F 12/44
(52) U.S. Cl. ........................... 460/69; 460/80
(58) Field of Search .................... 460/68, 69, 72, 460/71, 79, 80, 110, 119; 198/660, 661, 676; 56/68, 69, 72, 71, 79, 80, 110, 119

(56) References Cited

U.S. PATENT DOCUMENTS

| 3,464,419 A | * | 9/1969 | De Pauw et al. ............. 460/68 |
| 3,828,794 A | | 8/1974 | Gochanour et al. ........ 130/27 T |
| 4,244,380 A | * | 1/1981 | DePauw et al. ............. 460/108 |
| RE31,257 E | * | 5/1983 | Glaser et al. ................. 460/80 |
| 4,611,605 A | | 9/1986 | Hall et al. ..................... 130/23 |
| 5,387,153 A | | 2/1995 | Tanis ........................... 460/68 |
| 5,445,563 A | * | 8/1995 | Stickler et al. ............... 460/69 |

FOREIGN PATENT DOCUMENTS

| DE | 36 08 098 C2 | 9/1987 |
| DE | 196 41 211 A1 | 3/1998 |
| DE | 199 46 249 A1 | 5/2001 |
| EP | 0 522 267 A2 | 1/1993 |
| FR | 1 543 147 | 10/1968 |

* cited by examiner

*Primary Examiner*—Meredith C. Petravick

(57) ABSTRACT

An axial separator of an agricultural combine comprises a rotor housed in a housing. The housing includes a lower separating grate and a top cover plate with spiral-shaped guide vanes, which are aligned to feed harvested crop on a helical path. A section of one of the guide vanes forms an acute angle with the housing as it extends outwardly therefrom.

3 Claims, 3 Drawing Sheets

AXIAL SEPARATOR WITH GUIDE VANE

FIELD OF THE INVENTION

The present invention is directed to an axial separator wherein the upper cover plate is provided with a spiral-shaped guide vane, to guide harvested crop on a helical path.

BACKGROUND OF THE INVENTION

A combine with an axial separator is described in U.S. Pat. No. 3,828,794 A. The axial separator includes a rotor which has crop processing elements and which extends in the direction of travel of the combine and is arranged inside a housing. On the plate of the housing there are grates, through which threshed grains fall and are fed to a cleaning device. Spiral-shaped guide vanes are attached to the top side of the housing, which are used to lead the crop gradually backwards.

The guide vanes extend in spiral form radially relative to the axis of the rotor. The optimum pitch of the guide vanes, i.e., the degree by which their downstream end is shifted backwards against the direction of travel relative to the upstream end (or their angle to the rotor axis), can depend on the type of crop being processed. For crops with relatively small grains, such as wheat, it is important to maintain low power requirements for the axial separator, which means a relatively large pitch of the guide vanes, because the crop then leaves the axial separator faster, so that only a smaller amount of crop has to be moved in the axial separator. On the other hand, one goal for crops with rather large grains, such as peas and corn, is to keep the so-called dribble losses low. These losses are generated when the grains impact the guide vanes and are deflected in the direction towards the rear side of the axial separating device, where they leave the combine and are lost. To maintain low dribble losses, it is important that the guide vanes have a relatively small pitch. It is certainly possible to exchange the cover plates filled with guide vanes in order to adapt to the type of crop to be harvested, but this is very expensive.

SUMMARY OF THE INVENTION

It is an object of the present invention to provide improved guide vanes for an axial separator.

It is proposed to orient the surface of one section of one guide vane (or several or all guide vanes of an axial separating device) at an acute angle to the radial direction of the rotor. If grains impact the surface of the guide vane according to the invention, they are not deflected exactly backwards, where they can be lost from the harvesting process, but instead they are deflected downwards or upwards, so that they are further guided together with the crop and led through the separating grate to the cleaning device.

In this way, particularly for crops with rather large grains, the loss of grains is reduced. It is possible to also use guide vanes with a relatively large slope for such crops, so that when there is a change in the type of harvested crop, a replacement of the cover plates for changing the slope of the guide vanes is not necessary. The guide vanes according to the invention can be used for axial separating devices, which feature a threshing section and a separating section, and also for axial separating devices, which are arranged behind a conventional threshing cylinder.

With reference to the direction of the surface of the guide vane not extending radial to the axis of the rotor, various possibilities are conceivable with the scope of the design according to the invention. In one embodiment, the guide vane features one section extending forward or the guide vane extends forwards across its entire height. Grains meeting this section from behind are thus deflected downwards. On the other hand, the guide vanes can also feature a section extending backwards (or extending backwards as a whole), by which the grains are deflected upwards. They then meet the housing of the axial separating device and are again deflected downwards from there so that they are guided into the crop flow. One advantage of guide vanes angled backwards is that no crop can collect at their front side. It is also conceivable to use guide vanes with triangular cross sections, which are manufactured as hollow profiles or as solid bodies. These guide vanes can feature a front surface extending approximately radially and a rear surface extending diagonally backwards at an acute angle to the housing. One angle of the triangle is thus attached to the cover plate. Such guide vanes have the advantage that they actively guide the crop on their front side and generate no undesired dribble losses at their rear side. However, it is also conceivable to arrange the front wall radially to the rotor axis and to incline the rear wall downwards. This produces a triangle standing on its apex.

The sections of the guide vanes angled forwards or backwards can also be combined with sections extending radially to the axis of the rotor.

In another embodiment, the guide vane has a sinusoidal cross section.

DETAILED DESCRIPTION

Figure 1:
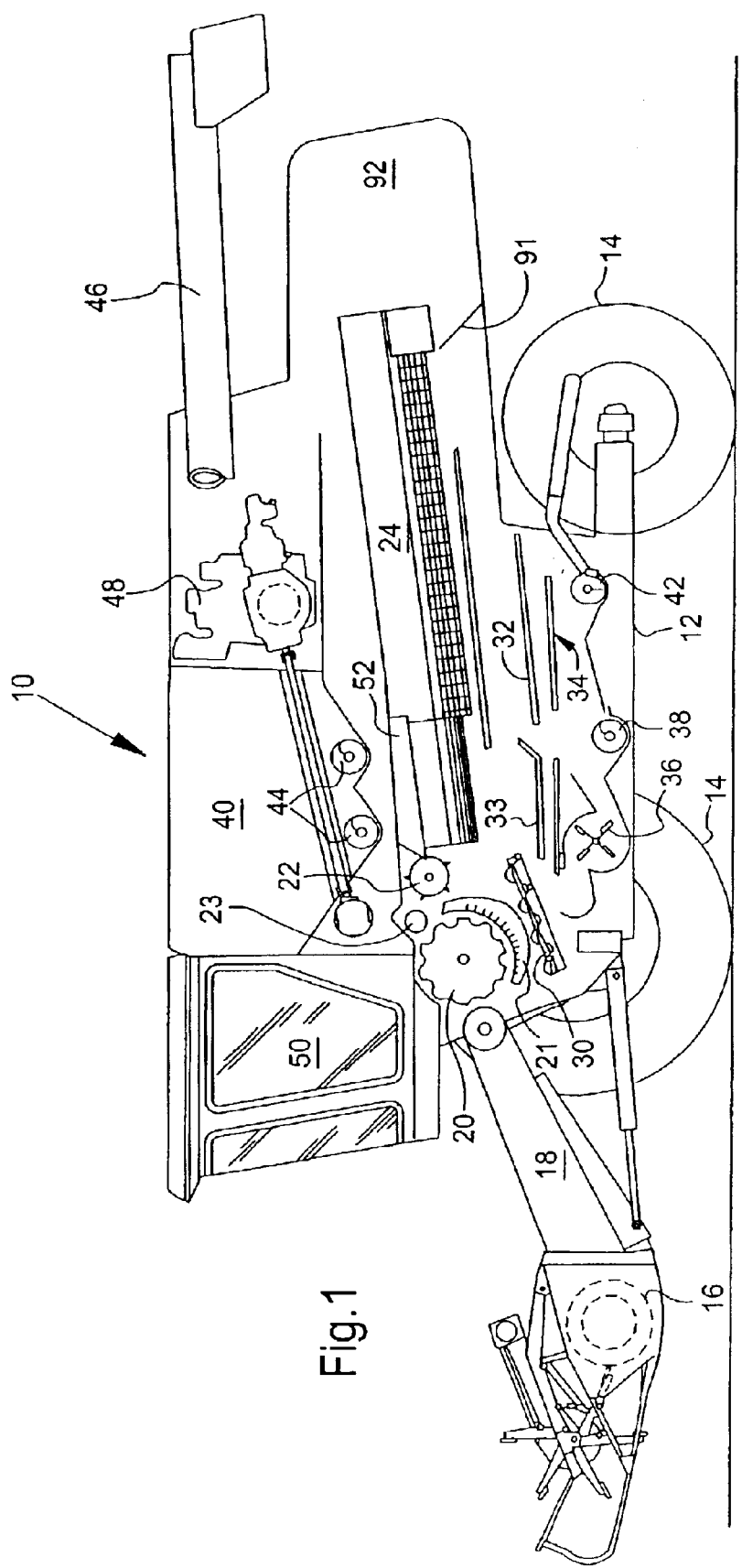
FIG. 1 is a side schematic view of a combine.

FIG. 1 shows an agricultural combine 10 having a support frame 12 that is supported on and propelled by wheels 14. The wheels 14 are driven by a drive assembly, not shown, powered by internal combustion engine 48. A harvesting assembly 16 is mounted on a feeder house 18 that extends forwardly from the combine 10. The harvesting assembly 16 harvests agricultural crops and directs them to the feeder house 18 which conveys the harvested crop material upwardly and rearwardly into the combine 10. The feeder house 18 directs the harvested crop material to a threshing assembly that comprises a transverse threshing cylinder 20 and an associated concave 21. The threshed crops are then fed to a scraper roller 23 and a beater 22 which directs the threshed crop material into an axial separator 24. However, it is also conceivable to exclude the transverse threshing cylinder 20 and concave 21 and to use an axial threshing assembly that is integral with and extends forwardly from the axial separator 24. There can be a single axial separator or two (or more) axial separators.

Grain and chaff, which are separated during the threshing process, fall onto at least one auger 30, which feeds these materials to a grain pan 33. In contrast, grain and chaff, which exit the axial separator 24, fall onto a shaker plate 32, and then continue to the grain pan 33. The grain pan 33 advances the grain and chaff to a sieve 34, which is associated with a cleaning fan 36 that blows chaff out the rear of the combine 10 and allows clean grain to fall to grain auger 38. The grain auger 38 collects the grain and directs it to an elevator, not shown, which elevates the clean grain to grain tank 40. A returns auger 42 directs unthreshed heads through another elevator (not shown) back to the threshing assembly. Finally, the cleaned grain is unloaded from the grain tank 40 by an unloading assembly comprising cross augers 44 and unloading conveyor 46.

All of the various systems mentioned above are driven by means of an internal combustion engine 48, which is operated by an operator from cab 50. The various devices for threshing, conveying, cleaning, and separating are located within the support frame 12.

Figure 2:
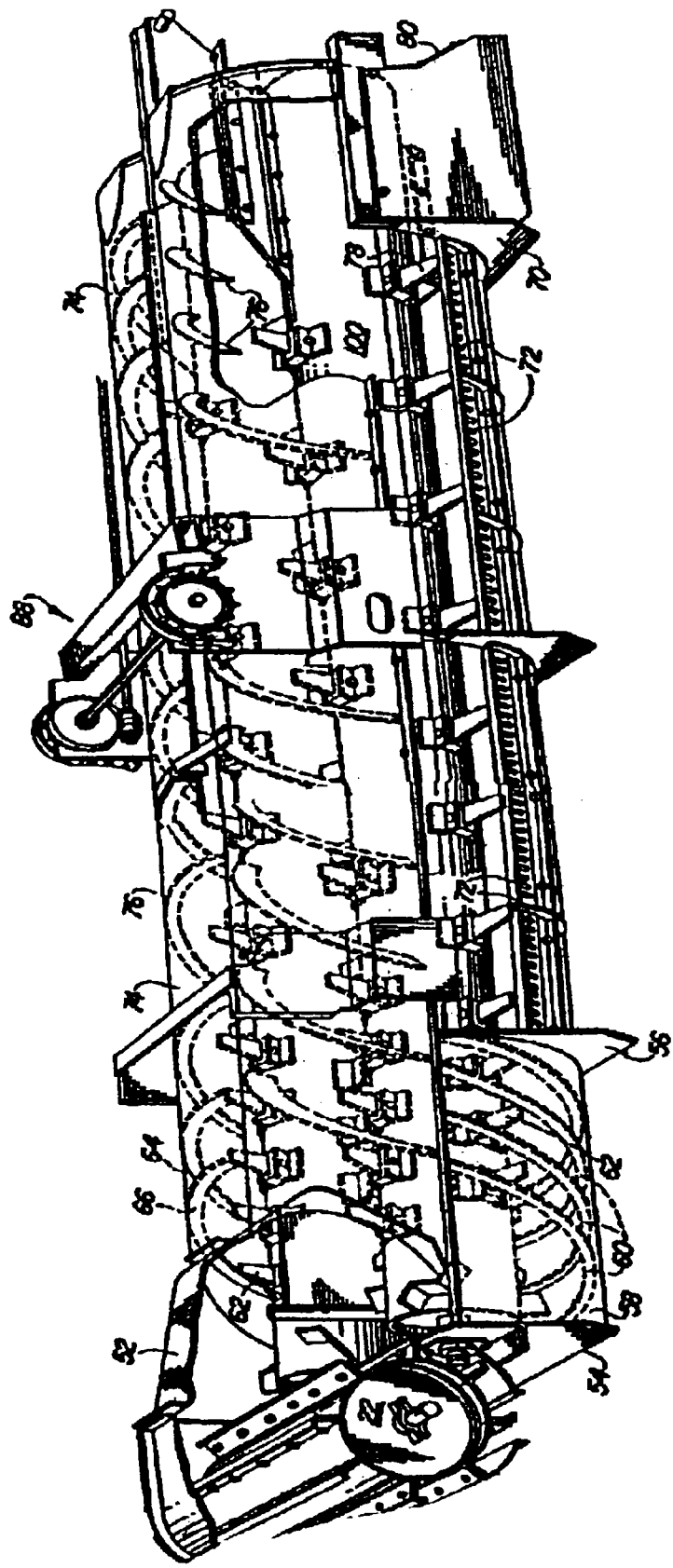
FIG. 2 is a perspective view of the axial separator.

The configuration of the axial separator 24 is shown best in FIG. 2. The feeding zone for both units of the axial separator extends from a front cross plate 54 to cross plate 56 and is provided with a bottom plate 58. From the bottom plate 58, spiral-shaped guide vanes 60 extend upwards, which are illustrated with broken lines and which move the threshed crop backwards into a separating zone. In the feeding zone, the rotor is equipped with rigidly attached prongs 62, which are shorter than the prongs 78 located in the separating zone of the axial separator 24. A cover 64 in the feeding zone has guide vanes 66 directed downwards, which move the threshed crop backwards within the feeding zone.

The separating zone extends from cross plate 56 to cross plate 70. The grate region of each unit of the axial separator 24 is provided in the separating zone with a separating grate, which is assembled from finger grates 72. Grain and chaff, which are separated in the separating zone from the crop, fall through the finger grates 72 onto the shaker plate 32. Upper cover plates 74 for the separating zone are equipped with spiral-shaped sliding runners or guide vanes 76 extending inwards for moving the material backwards. Because the grate region is not filled with spiral-shaped guide vanes 76 in the separating zone, the prongs 78 rigidly attached in the separating zone to rotor 100 are longer than the prongs 62.

An output zone extends from the fourth cross plate 70 up to a rear cross plate 80. The output zone is open at the bottom. The cover over the output zone is an extension of the top cover plate 74 and is also equipped with spiral-shaped guide vanes. From the axial separator 24, threshed crop residue (straw) is discharged downwards through the open bottom. Due to the effect of the force of gravity, the crop residue falls onto a straw guiding sheet 91 and exits the combine 10 downwards through an opening in the plate of the output hood 92 and is laid on the field as a swath.

Figure 3:
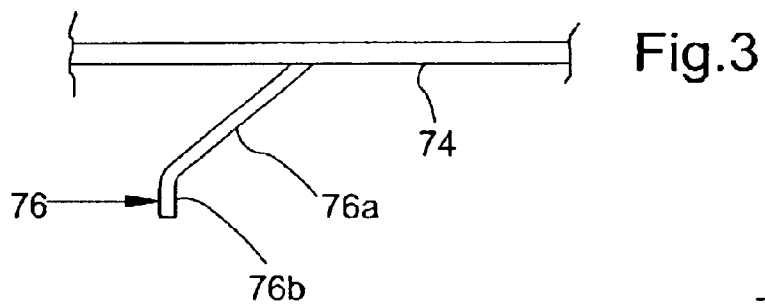
FIG. 3 is a cross sectional view of a first embodiment of the guide vanes of the axial separator.

FIG. 3 shows a vertical cross section taken along the longitudinal axis of the axial separator 24 through a first embodiment of the guide vanes 76 according to the invention. The guide vanes 76, which cannot be seen in FIG. 2 due to the significantly smaller representation, are not arranged radially to the axis of the rotor 100, but at an angle to this axis. The guide vanes according to FIG. 3 feature a top section 76a, which extends from the cover plate 74 at an angle of approximately 45° downwards and forwards against the direction of the crop flow. The top section 76a transitions into a lower section 76b, which extends downwards approximately vertical.

Figure 4:
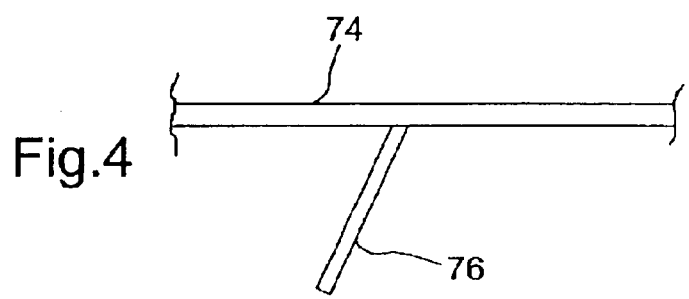
FIG. 4 is a cross sectional view of a second embodiment of the guide vanes of the axial separator.

The second embodiment of the guide vanes 76 according to FIG. 4 features only a single section, which extends downwards from the cover plate 74 at an angle of approximately 45° diagonally and forwards against the direction of the crop flow.

Figure 5:
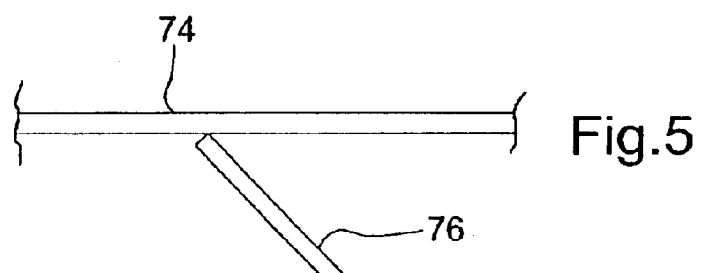
FIG. 5 is a cross sectional view of a third embodiment of the guide vanes of the axial separator.

The third embodiment of the guide vanes 76 according to FIG. 5 features only a single section, which extends from the cover plate 74 at an angle of approximately 45° diagonally downwards and backwards in the direction of the crop flow.

Figure 6:
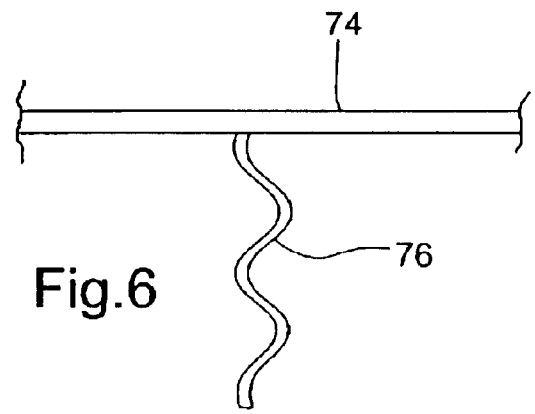
FIG. 6 is a cross sectional view of a fourth embodiment of the guide vanes of the axial separator.

FIG. 6 represents a fourth embodiment of the guide vanes 76. The guide vanes 76 have a sinusoid shape and extend downwards from the cover plate 74.

Figure 7:
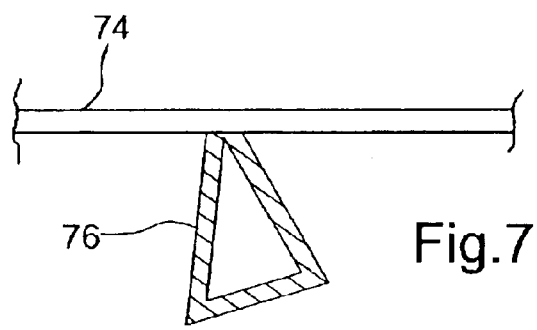
FIG. 7 is a cross sectional view of a fifth embodiment of the guide vanes of the axial separator.

In FIG. 7, a cross section through a fifth embodiment of the guide vanes 76 is shown. The guide vane 76 is a triangular hollow profile. A front wall of the hollow profile extends downwards from the cover plate 74 approximately radially to the axis of the rotor 100. A back wall of the hollow profile extends approximately like the guide vane 76 of FIG. 5. The two walls are connected to each other by a third, lower wall, which extends diagonally backwards and upwards from the lower edge of the front wall up to the lower edge of the back wall.

The guide vanes 76 illustrated in FIGS. 3–7 extend in the form of a spiral to the top side of the cover plates 74, as illustrated in FIG. 2. Their cross section is preferably constant across the length of the guide vanes, although it would also be possible for the cross section to vary over the length. Thus, the guide vanes 76 could first extend radially to the axis of the rotor 100 at the left and right ends, i.e., starting from the separating grate, and transition continuously into a cross section not oriented radially, as illustrated in FIGS. 3–6. The guide vanes 76 can also appear in the feeding zone instead of the guide vanes 60 oriented radially to the axis of the rotor 100. It is also conceivable to distribute guide vanes 76 of different cross sections across the length of the rotor 100 in a combine 10. Thus, one or more types of guide vanes 76 according to FIGS. 3–7 and/or mixed with radially oriented guide vanes can be distributed across the length of the rotors 100.

Having described the illustrated embodiment, it will become apparent that various modifications can be made without departing from the scope of the invention as defined in the accompanying claims.

What is claimed is:

1. An axial separator having a rotor that is housed within a housing, the housing including a lower separating grate and at least one top cover plate, the top cover plate is provided with a spiral-shaped guide vane, which is aligned to feed harvested crop on a helical path, characterized in that a section of the guide vane is provided with a surface that forms an acute angle with the top cover plate wherein the section extends diagonally forward from the top cover plate against the direction of the crop flow.

2. The axial separator as defined by claim 1 wherein the section has an outermost portion that is adjacent to the rotor, which extends parallel to the radius of the rotor.

3. An axial separator having a rotor that is housed within a housing, the housing including a tower separating grate and at least one top cover plate, the top cover plate is provided with a spiral-shaped guide vane, which is aligned to feed harvested crop on a helical path, characterized in that the guide vane has a sinusoidal cross section.

* * * * *